United States Patent
Isogai et al.

(10) Patent No.: US 9,296,829 B2
(45) Date of Patent: *Mar. 29, 2016

(54) METHOD FOR PRODUCING HYDROPHILIZED CELLULOSE FIBER, AND METHOD FOR REDUCING OXIDIZED CELLULOSE FIBER

(75) Inventors: Akira Isogai, Tokyo (JP); Chiaki Tanaka, Ayabe (JP); Yoshinari Yui, Ayabe (JP)

(73) Assignee: GUNZE LIMITED, Ayabe-shi (JP)

(*) Notice: Subject to any disclaimer, the term of this patent is extended or adjusted under 35 U.S.C. 154(b) by 168 days.

This patent is subject to a terminal disclaimer.

(21) Appl. No.: 13/993,448

(22) PCT Filed: Jan. 18, 2012

(86) PCT No.: PCT/JP2012/050992
§ 371 (c)(1),
(2), (4) Date: Jun. 28, 2013

(87) PCT Pub. No.: WO2012/102153
PCT Pub. Date: Aug. 2, 2012

(65) Prior Publication Data
US 2013/0296544 A1   Nov. 7, 2013

(30) Foreign Application Priority Data
Jan. 26, 2011   (JP) ................. 2011-013920

(51) Int. Cl.
| | |
|---|---|
| C08B 15/00 | (2006.01) |
| C08B 15/04 | (2006.01) |
| D06M 23/00 | (2006.01) |
| D06M 11/34 | (2006.01) |
| D06M 11/50 | (2006.01) |
| D06M 11/80 | (2006.01) |
| D06M 13/322 | (2006.01) |
| D06M 101/06 | (2006.01) |

(52) U.S. Cl.
CPC ............... *C08B 15/00* (2013.01); *C08B 15/04* (2013.01); *D06M 11/34* (2013.01); *D06M 11/50* (2013.01); *D06M 11/80* (2013.01); *D06M 13/322* (2013.01); *D06M 23/00* (2013.01); *D06M 2101/06* (2013.01)

(58) Field of Classification Search
CPC ....... C08B 15/00; C08B 15/04; D06M 11/34; D06M 11/50; D06M 11/80
USPC ..................................................... 536/56, 124
See application file for complete search history.

(56) References Cited

U.S. PATENT DOCUMENTS

| | | | |
|---|---|---|---|
| 6,379,494 B1 | 4/2002 | Jewell et al. | |
| 2003/0083491 A1 | 5/2003 | Komen et al. | |
| 2010/0233481 A1 | 9/2010 | Isogai et al. | |
| 2012/0130064 A1* | 5/2012 | Isogai et al. | ................... 536/56 |

FOREIGN PATENT DOCUMENTS

| | | |
|---|---|---|
| CN | 1155914 A | 7/1997 |
| CN | 101874043 A | 10/2010 |
| JP | 2003-89701 A | 3/2003 |
| JP | 2003-512540 A | 4/2003 |
| JP | 2008-001728 A | 1/2008 |
| WO | 96/31645 A1 | 10/1996 |
| WO | 01/29309 A1 | 4/2001 |
| WO | 2009/107637 A1 | 9/2009 |
| WO | 2011/024807 A1 | 3/2011 |

OTHER PUBLICATIONS

International Search Report for PCT/JP2012/050992, mailing date of Apr. 17, 2012.

* cited by examiner

*Primary Examiner* — Scarlett Goon
*Assistant Examiner* — Everett White
(74) *Attorney, Agent, or Firm* — Westerman, Hattori, Daniels & Adrian, LLP

(57) ABSTRACT

This invention provides a method for hydrophilic cellulose fibers capable of inhibiting decrease in the degree of polymerization and whiteness degree of oxidized cellulose fibers in oxidized cellulose in which a carbon at position 6 of each glucose unit in the cellulose fiber starting material is oxidized to a carboxyl group, the method comprising (A) the step of performing dehalogenation together with reduction, the dehalogenation comprising mixing a dehalogenation agent, a reducing agent, and oxidized cellulose fibers, and removing halogens remaining in the oxidized cellulose fibers, and the reduction comprising reducing a ketone group at position 2 and/or position 3 of each glucose unit in the oxidized cellulose fibers.

10 Claims, No Drawings

METHOD FOR PRODUCING HYDROPHILIZED CELLULOSE FIBER, AND METHOD FOR REDUCING OXIDIZED CELLULOSE FIBER

TECHNICAL FIELD

The present invention relates to a method for producing hydrophilic cellulose fibers, and a method for reducing oxidized cellulose fibers. More specifically, the present invention relates to a method for producing hydrophilic cellulose fibers in which a dehalogenation step and a reduction step are performed at the same time in the same bath, and a method for reducing oxidized cellulose fibers in which a dehalogenation step and a reduction step are performed on the oxidized cellulose fibers at the same time in the same bath.

BACKGROUND ART

High moisture-absorbing and moisture-releasing properties have been required for cotton clothing products (cellulose fiber products) such as underwear. To obtain such cotton clothing products (cellulose fiber products) with high moisture-absorbing and moisture-releasing properties, a method for hydrophilic treatment of cellulose fiber, which is used as a starting material, can be used. One typical method for hydrophilic treatment of cellulose fiber among various methods is oxidation of the hydroxyl group in the cellulose into a carboxyl group.

To oxidize the hydroxy group in the cellulose into a carboxyl group, a method for oxidizing a cellulose fiber starting material in a reaction solution containing a halogen-based oxidizing agent and an N-oxyl compound such as 2,2,6,6-tetramethylpiperidine N-oxyl (TEMPO) is known. Another known method is a method in which dehalogenation to remove halogens remaining in oxidized cellulose is performed, and then reduction to reduce a ketone group at position 2 and/or position 3 of a glucose unit, which is generated by the production of oxidized cellulose fibers, is performed (e.g., Patent Literature 1).

CITATION LIST

Patent Literature

[PTL 1] WO2009/107637

SUMMARY OF INVENTION

Technical Problem

As described above, in the step of hydrophilizing a cellulose fiber starting material, the dehalogenation step and the reduction step have been separately performed in a different bath. This is because an oxidizing agent such as aqueous hydrogen peroxide has been used as a dehalogenation agent in the dehalogenation step, and performing dehalogenation and reduction at the same time has been considered to cause an oxidation-reduction reaction with a reducing agent used in the reduction step, preventing both the dehalogenation and the reduction of oxidized cellulose fibers from being fully performed.

Contrary to the above assumption, the present invention found that by performing dehalogenation and reduction at the same time in the same bath, halogens remaining in oxidized cellulose can be fully removed, and a ketone group at position 2 and/or position 3 of a glucose unit, which is generated by the production of oxidized cellulose fiber, can be fully reduced.

Based on the above findings, an object of the present invention is to provide a method for producing hydrophilic cellulose fibers having no decrease in whiteness degree, the method being capable of inhibiting decrease in the degree of polymerization of oxidized cellulose fibers in oxidized cellulose in which a carbon at position 6 of each glucose unit in a cellulose fiber starting material is oxidized to a carboxyl group.

Technical Solution

The present inventors conducted extensive research to solve the above problem, and found that by performing a dehalogenation step and a reduction step, which have been performed separately in a different bath, at the same time, a decrease in the degree of polymerization of oxidized cellulose fibers can be inhibited, and hydrophilic cellulose fibers having no decrease in whiteness degree can be obtained. The present invention has been accomplished based on the above findings.

Item 1. A method for producing hydrophilic cellulose fibers, comprising (A) the step of performing dehalogenation together with reduction, the dehalogenation comprising mixing a dehalogenation agent, a reducing agent, and oxidized cellulose fibers to remove halogens remaining in the oxidized cellulose fibers, and the reduction comprising reducing a ketone group at position 2 and/or position 3 of each glucose unit in the oxidized cellulose fibers.

Item 2. The method for producing hydrophilic cellulose fibers according to item 1, wherein Step (A) is a step of performing the reduction together with the dehalogenation by adding the oxidized cellulose fibers to a reaction solution containing a dehalogenation agent and a reducing agent.

Item 3. The method for producing hydrophilic cellulose fibers according to item 1 or 2, wherein the dehalogenation agent is at least one member selected from the group consisting of hydrogen peroxide, ozone, sodium peroxide, sodium perborate, sodium percarbonate, and peracetic acid.

Item 4. The method for producing hydrophilic cellulose fibers according to any one of items 1 to 3, wherein the reducing agent is at least one member selected from the group consisting of thiourea, hydrosulfite, sodium hydrogen sulfite, sodium borohydride, sodium cyanoborohydride, lithium borohydride, sodium acid sulfite, and thiourea dioxide.

Item 5. The method for producing hydrophilic cellulose fibers according to any one of items 2 to 4, wherein the reaction solution in Step (A) has a pH of 7 to 12.

Item 6. The method for producing hydrophilic cellulose fibers according to any one of items 2 to 5, wherein the reaction solution in Step (A) has a temperature of 10 to 90° C.

Item 7. The method for producing hydrophilic cellulose fibers according to any one of items 1 to 6, wherein oxidized cellulose is obtained by (1) a first oxidation step of oxidizing cellulose fibers in a reaction solution containing an N-oxyl compound and an oxidizing agent for the N-oxyl compound.

Item 8. The method for producing hydrophilic cellulose fibers according to item 7, wherein the oxidizing agent is a hypohalous acid, a halogenated isocyanuric acid, or a salt thereof.

Item 9. The method for producing hydrophilic cellulose fibers according to item 7 or 8, wherein the oxidized cellulose is obtained by (2) a second oxidation step in which an aldehyde group present in the oxidized cellulose fibers obtained in Step (1) is oxidized by oxidizing the oxidized cellulose fibers obtained in Step (1) in a second reaction solution containing an oxidizing agent.

Item 10. The method for producing hydrophilic cellulose fibers according to any one of items 7 to 9, wherein the first reaction solution further comprises a promoter in Step (1).

Item 11. The method for producing hydrophilic cellulose fibers according to item 9 or 10, wherein the oxidizing agent in Step (2) is a halogen oxidizing agent.

Item 12. A method for reducing oxidized cellulose fibers comprising performing dehalogenation together with reduction the dehalogenation comprising mixing a dehalogenation agent, a reducing agent, and oxidized cellulose fibers to remove halogens remaining in the oxidized cellulose fibers, and the reduction comprising reducing a ketone group at position 2 and/or position 3 of each glucose unit in the oxidized cellulose fibers.

Advantageous Effects of Invention

The method for producing hydrophilic cellulose fibers of the present invention can inhibit a decrease in the degree of polymerization of oxidized cellulose fibers in oxidized cellulose in which a carbon at position 6 of a glucose unit in the cellulose fiber starting material is oxidized to a carboxyl group, and can provide hydrophilic cellulose fibers having no decrease in whiteness degree.

DESCRIPTION OF EMBODIMENTS

The method for producing hydrophilic cellulose fibers and the method for reducing oxidized cellulose fibers of the present invention are explained in detail below.

Examples of the cellulose fiber starting material used in the method for producing hydrophilic cellulose fibers of the present invention include native cellulose fibers derived from plants, animals, or bacteria-derived gels; and regenerated cellulose fibers. Specific examples thereof include native cellulose fibers such as cotton, hemp, pulp, and bacteria cellulose; and regenerated cellulose fibers such as rayon and cupra.

The form of the cellulose fiber starting material is not limited to woven and non-woven fabrics, and includes filamentous articles such as filaments, staples, and strings. The contexture of the fiber may be varied, including combined filament, mixed spun, union fabric, mixed woven, and mixed knitted.

The cellulose fiber starting material subjected to washing with water and refinement beforehand is preferable to make cellulose fibers sufficiently hydrophilic in the subsequent step and to exhibit a sufficient bleaching effect. The "refinement" herein means a treatment to remove impurities contained in native fibers, oils added in spinning and knitting steps, or machine oils, iron rust, etc., adhered in an operation step.

The oxidized cellulose fibers to be subjected to dehalogenation and reduction by Step (A) described below are preferably oxidized cellulose fibers obtained by the first oxidation in Step (1) and the second oxidation in Step (2).

Step (1) and Step (2) are explained below.
Step (1) (First Oxidation)

In Step (1), the cellulose fibers are oxidized in the first reaction solution containing an N-oxyl compound and an oxidizing agent.

The N-oxyl compound contained in the first reaction solution is used as a catalyst for the oxidation of the cellulose fibers. Examples of the N-oxyl compound include a compound represented by formula (I):

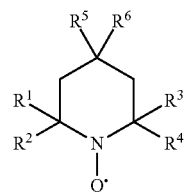

(I)

wherein $R^1$ to $R^4$, which are the same or different, and each represent an alkyl group having about 1 to 4 carbon atoms; and $R^5$ and $R^6$, which are the same or different, each represent a hydrogen atom, acetylamino group, carboxyl group, phosphonooxy group, amino group, 2-halogenated acetylamino group substituted with halogen (fluorine, chlorine, bromine, or iodine), hydroxy group, alkoxy group having about 1 to 4 carbon atoms, adamantane group; and $R^5$ and $R^6$ are bonded via an oxygen atom and may form an oxo group, or a compound represented by formula (II):

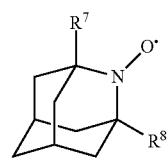

(II)

wherein $R^7$ and $R^8$, which are the same or different, and each represent a hydrogen atom or alkyl group having about 1 to 4 carbon atoms.

Examples of the N-oxyl compound include 2,2,6,6-tetramethylpiperidine-N-oxyl (TEMPO), TEMPO derivatives having various functional groups at the C4 position, 2-azaadamantane N-oxyl, and the like.

Examples of the TEMPO derivatives include 4-acetamide TEMPO, 4-carboxy TEMPO, 4-phosphonooxy TEMPO, 4-amino TEMPO, 4-(2-bromoacetamide) TEMPO, 4-hydroxy TEMPO, 4-oxy TEMPO, 4-methoxy TEMPO, and the like.

Of these N-oxyl compounds, TEMPO, 4-methoxy TEMPO, and 4-acetamide TEMPO are preferable because the reaction speed for oxidizing a carbon at position 6 of the glucose unit in the cellulose fiber is fast.

A sufficient effect is ensured from the addition of a catalytic amount of an N-oxyl compound. More specifically, the addition amount of the N-oxyl compound is preferably about 0.01 to 3 g/L based on the amount of the reaction solution. Because the addition amount of the N-oxyl compound does not greatly affect the degree of the hydrophilic treatment or the quality of the resulting cellulose fiber, it preferably ranges from about 0.1 to 2 g/L for cost savings.

The addition amount of the N-oxyl compound in the reaction solution is preferably about 0.03 to 9.0% owf, and more preferably about 0.75 to 6.0% owf. The unit "% owf" indicates the weight per gram of the fibers.

A hypohalous acid, a halogenated isocyanuric acid, or a salt thereof is preferably used as an oxidizing agent contained in the first reaction solution in Step (1).

Examples of halogen constituting the hypohalous acid include chlorine, bromine, and iodine, specifically, hypochlorous acid, hypobromous acid, and hypoiodous acid.

Examples of metallic salts that form a hypohalite include alkali metal salts such as lithium, potassium, or sodium; alkali earth metal salts, such as calcium, magnesium, or strontium; and a salt of ammonium and hypohalous acid.

More specifically, examples of the hypochlorous acid include lithium hypochlorite, potassium hypochlorite, sodium hypochlorite, calcium hypochlorite, magnesium hypochlorite, strontium hypochlorite, ammonium hypochlorite, and corresponding hypobromites and hypoiodites.

Of these, a hypohalous acid alkali metal salt is preferably used as the oxidizing agent in the first oxidation step. A hypochlorous acid alkali metal salt (such as sodium hypochlorite) is more preferable.

As a halogenated isocyanuric acid or a salt thereof, those represented by formula III:

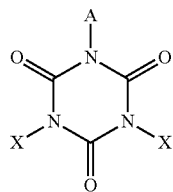

wherein A represents a hydrogen atom, a halogen atom, such as fluorine, chlorine, bromine, and iodine, an alkali metal, or an alkali earth metal; and X, which is the same or different, each represent a halogen atom, such as fluorine, chlorine, bromine, and iodine,
or salts thereof can be used.

Examples of the alkali metal that forms halogenated isocyanurate include lithium, potassium, sodium, and the like. Examples of the alkali earth metal that forms halogenated isocyanurate include calcium, magnesium, strontium, and the like. A salt of ammonium and a halogenated isocyanuric acid can also be used.

Examples of the halogenated isocyanuric acid include dichloroisocyanuric acid, trichloroisocyanuric acid, and the like. Examples of the halogenated isocyanurate include sodium dichloroisocyanurate and the like. Of these, sodium dichloroisocyanurate and sodium dichloroisocyanurate dihydrate are preferable because they have high water solubility, and excellent bleaching and sterilization effects in water.

The addition amount of the oxidizing agent in the reaction solution is preferably about 0.03 to 10 g/L, and more preferably about 1.0 to 5.0 g/L. By setting the addition amount of a halogenated isocyanuric acid or a salt thereof to about 1.0 g/L or more, the hydrophilic and breaching effect of the cellulose fibers can be improved, and by setting the addition amount to about 5.0 g/L or less, a reduction in degree of polymerization or texture can be inhibited.

The addition amount of the oxidizing agent is preferably about 0.1 to 30% owf, and more preferably about 3.0 to 15% owf.

Further, in the first oxidation in Step (1), it is also possible to use a catalyst component formed of a combination of an N-oxyl compound and a promoter. Examples of the promoter include salts of halogen and alkali metal (alkali metal salts), salts of halogen and alkali earth metal (alkali earth metal salts), ammonium salts, and sulfates. Examples of halogen that forms the alkali metal salts, alkali earth metal salts, or ammonium salts include chlorine, bromine, and iodine. Examples of alkali metal that forms alkali metal salts include lithium, potassium, and sodium. Examples of alkali earth metal that forms alkali earth metal salts include calcium, magnesium, and strontium.

More specifically, lithium bromide, potassium bromide, sodium bromide, lithium iodide, potassium iodide, sodium iodide, lithium chloride, potassium chloride, sodium chloride, calcium bromide, magnesium bromide, strontium bromide, calcium iodide, magnesium iodide, strontium iodide, calcium chloride, magnesium chloride, strontium chloride, and the like may be used.

Examples of ammonium salts include ammonium bromide, ammonium iodide, and ammonium chloride. Further, examples of sulfates include sodium sulfate (salt cake), sodium hydrogen sulfate, and alum. These promoters may be used singly, or in a combination of two or more. These promoters may form a hydrate.

The pH of the first reaction solution used in the first oxidation in Step (1) is preferably kept in the range of about 4 to 12, more preferably in the range of about 8 to 11, which is a suitable range to allow the oxidized N-oxyl compound to act on the cellulose fibers.

The pH of the first reaction solution may be adjusted by adding a basic substance (ammonia, potassium hydroxide, sodium hydroxide, etc.) or acidic substance (organic acid such as acetic acid, oxalic acid, succinic acid, glycolic acid, malic acid, citric acid, or benzoic acid; or inorganic acid such as nitric acid, hydrochloric acid, sulfuric acid, or phosphoric acid) as appropriate.

It is also possible to add a penetrant to the first reaction solution used in the first oxidation in Step (1). Examples of the penetrant include known penetrants for cellulose fibers, namely, anionic surfactants (carboxylate, alkyl sulfate, sulfonate, phosphate, etc.) and nonionic surfactants (polyethyleneglycol-based, polyalcohol-based, etc.), such as Shintol (product name of Takamatsu Oil & Fat Co., Ltd.), etc.

By adding a penetrant to the first reaction solution, it is possible to allow the chemical agents to infiltrate into the cellulose fibers, thereby introducing more carboxyl groups (aldehyde groups) into the cellulose fiber surface. This increases hydrophilicity (hygroscopic property) of the cellulose fibers.

The process of oxidizing cellulose fibers in Step (1) is not particularly limited. One preferable process is that an N-oxyl compound and a promoter are first added to a reaction solvent, then cellulose fibers are immersed therein, and an oxidizing agent is added thereto. By oxidizing the cellulose fibers in such a manner, the N-oxyl compound and the promoter infiltrate into the cellulose fibers. Thus, the hydrophilic treatment can be performed without making unevenness during production.

The first oxidation as described above enables supply of an oxidizing agent to a treatment bath only in an amount required for the oxidation reaction of cellulose fibers. Therefore, it is possible to reduce the amount of halogen or salt thereof that is not conducive to the reaction, thereby reducing the cost for hydrophilic treatment.

The bath ratio of the first reaction solution and the cellulose fibers used in the first oxidation is such that the first reaction solution per gram of the cellulose fibers is preferably about 10 to 100 g, and more preferably about 15 to 30 g. By setting the amount of the first reaction solution to about 15 g or more per gram of the cellulose fibers, an excellent contact efficiency between the cellulose fibers and the reaction solution can be attained. By setting the amount of the first reaction solution to about 30 g or less per gram of the cellulose fibers, the contact efficiency between the cellulose fibers and the reaction solution can be maintained.

The temperature of the first oxidation in Step (1) is preferably about 0° C. or more, and more preferably about 20° C. or more, because a COOH group can be sufficiently introduced and evaporation of the oxidizing agent can be prevented to maintain available chlorine. The temperature of the first oxidation in Step (1) is also preferably about 50° C. or less, and more preferably about 30° C. or less, because the degree of polymerization of cellulose is not lowered and embrittlement of the cellulose fibers can be prevented.

The duration for the first oxidation in Step (1) is preferably about 1 min or more, and more preferably about 3 min or more, because a COOH group can be sufficiently introduced and the time until the reaction cycle starts is required. The duration for the first oxidation in Step (1) is preferably about 30 min or less, and more preferably about 15 min or less, because the degree of polymerization of cellulose is not lowered and embrittlement of the cellulose fibers can be prevented.

It is preferable that after the completion of the reaction, an unreacted oxidizing agent (a halogenic acid or a salt thereof; a halogenated isocyanuric acid or a salt thereof; or a halogenic acid in which a halogenated isocyanuric acid or a salt thereof is decomposed, or a salt thereof) be removed as necessary; and that afterward, washing be performed repeatedly.

Step 2 (Second Oxidation)

In Step (2), the oxidized cellulose fibers obtained in Step (1) are oxidized in the second reaction solution containing an oxidizing agent to oxidize an aldehyde group present in the oxidized cellulose fibers obtained in Step (1).

By the oxidation in Step (1), the primary hydroxyl group of the glucose unit residing in the microfibril surface of the cellulose fiber is selectively oxidized to a carboxyl group, and partially to an aldehyde group. Such a formation of the aldehyde group causes β-elimination reaction or color change by heating, leading to a decrease in strength due to the degradation of cellulose fibers.

Thus, by Step (2), the aldehyde group generated by the first oxidation in step (1) is oxidized to a carboxyl group to obtain oxidized cellulose fibers containing no aldehyde group.

The starting material used in the second oxidation in Step (2) is the oxidized cellulose fibers obtained in the first oxidation step.

The oxidizing agent used in the second oxidation in Step (2) is an oxidizing agent capable of converting an aldehyde group to a carboxyl group by oxidation. Specific examples of the oxidizing agent include halous acids or salts thereof (such as chlorous acid or a salt thereof, bromous acid or a salt thereof, or iodous acid or a salt thereof), and peracids (such as hydrogen peroxide, peracetic acid, persulfuric acid, or perbenzoic acid). These oxidizing agents may be used singly, or in a combination of two or more. These oxidizing agents may be combined with an oxidase such as laccase. The content of the oxidizing agent may be appropriately set; however, the content preferably ranges from 0.01 to 50 mmol/g based on the amount of the cellulose fibers.

Examples of halogens constituting the halous acid salt include chlorine, bromine, and iodine. Examples of salts forming the halous acid salts include lithium, potassium, sodium, and like alkali metal salts; calcium, magnesium, strontium and like alkali earth metal salts; and ammonium salts. In the case of chlorites, specific examples of the halous acid salts include lithium chlorite, potassium chlorite, sodium chlorite, calcium chlorite, magnesium chlorite, strontium chlorite, and ammonium chlorite, as well as corresponding bromous acid salts and iodous acid salts.

Examples of preferable oxidizing agents to be used in the second oxidation in Step (2) include halous acid alkali metal salts, more preferably chlorous acid alkali metal salts.

The addition amount of the oxidizing agent in the reaction solution is preferably about 1 to 90 g/L, and more preferably about 2 to 20 g/L. In particular, by setting the addition amount of the oxidizing agent to about 2 g/L or more, an effect of bleaching cellulose fibers in addition to an effect of the oxidation of the aldehyde group can be obtained. By setting the addition amount of the oxidizing agent to about 20 g/L or less, an effect of inhibiting embrittlement of the cellulose fibers due to chlorine of the oxidizing agent can be obtained.

The addition amount of the oxidizing agent is preferably about 2 to 180% owf, and more preferably about 4 to 40% owf.

In the second oxidation, the pH of the reaction solution is preferably kept between neutral and acidic. More specifically, the pH is between 3 and 7. In particular, it is important to keep the pH of the reaction solution 8 or less. By keeping the pH value within this range, it is possible to oxidize the aldehyde group to a carboxyl group while preventing β-elimination reaction caused by the aldehyde group generated at the C6 position of the cellulose in the first oxidation in Step 1, thereby performing hydrophilic treatment of cellulose fibers without decreasing the fiber strength.

Further, it is preferable to add a buffer to the second reaction solution. Various buffers, including phosphate buffers, acetic acid buffers, citric acid buffers, borate buffers, tartaric acid buffers, tris buffers, and the like, may be used.

The use of the buffer can prevent fluctuations in the pH of the reaction solution, and it becomes unnecessary to sequentially add acids and alkalis to maintain the pH.

The bath ratio of the second reaction solution and the cellulose fibers used in the second oxidation is such that the second reaction solution per gram of the cellulose fibers is preferably about 5 to 100 g, and more preferably about 10 to 30 g. By setting the amount of the second reaction solution to about 5 g or more per gram of the cellulose fibers, an excellent contact efficiency between the cellulose fibers and the reaction solution can be attained. By setting the amount of the second reaction solution to about 100 g or less per gram of the cellulose fibers, the contact efficiency between the cellulose fibers and the reaction solution can be maintained.

In the second oxidation, to improve the effect of reducing the embrittlement of cellulose fibers due to metals, a chelating agent, surfactant, penetrant, and the like, may be suitably added.

The temperature of the second oxidation in Step (2) is preferably about 60° C. or more, and more preferably about 70° C. or more because an aldehyde group can be sufficiently oxidized to a COOH group and the bleaching effect of cellulose fibers can be attained. The temperature of the second oxidation in Step (2) is also preferably about 98° C. or less, and more preferably about 90° C. or less because the degree of polymerization of cellulose is not lowered and embrittlement of cellulose fibers due to chlorine of an oxidizing agent can be prevented.

The duration for the second oxidation in Step (2) is preferably about 30 min or more and more preferably about 50 min or more because an aldehyde group can be sufficiently oxidized to a COOH group and the bleaching effect of cellulose fibers can be attained. The duration for the second oxidation in Step (2) is preferably about 120 min or less, and more preferably about 100 min or less because the degree of polymerization of cellulose is not lowered and embrittlement of the cellulose fibers due to chlorine of an oxidizing agent can be prevented.

Since the reaction vessel can be hermetically sealed in the second oxidation, the reaction vessel can be equipped with a pressure device for elevating pressure inside the vessel, and used in oxidation.

After completion of the oxidation in Step (2), it is preferable that the oxidation reaction be stopped as necessary, and washing with water be performed repeatedly.

Step (A) (Dehalogenation and Reduction)

In Step (A), the oxidized cellulose fibers are subjected to dehalogenation and reduction at the same time. Because of a halogen-based oxidizing agent that is used for obtaining oxidized cellulose fibers by oxidation of cellulose fiber starting material, halogens sometimes remain in the oxidized cellulose fibers. Dehalogenation is a step of removing such halogens remaining in the oxidized cellulose fibers.

The oxidation of the cellulose fiber starting material allows introduction of a carboxyl group into the cellulose fiber surface; however, in some cases, the fibers yellow (decrease in whiteness degree) due to the oxidation. This is presumably because the oxidation step, which induces carboxylation of the C6 position, also oxidizes a part of the C2 and C3 positions of the cellulose fiber, thereby generating ketone. To prevent such yellowing (decrease in whiteness degree) of the hydrophilic cellulose fibers, a reduction treatment using a reducing agent is performed so as to reduce the generated ketone.

In step (A), dehalogenation, in which a dehalogenation agent, a reducing agent, and oxidized cellulose fibers are mixed to remove halogens remaining in the oxidized cellulose fibers, is performed together with reduction in which a ketone group present in position 2 and/or position 3 of each glucose unit in the oxidized cellulose fibers is reduced.

To mix the dehalogenation agent, reducing agent, and oxidized cellulose fibers, it is preferable to prepare a reaction solution containing the dehalogenation agent and the reducing agent, and add the oxidized cellulose fibers to the reaction solution, because the reaction solution can be uniformly in contact with the oxidized cellulose fibers.

Examples of the dehalogenation agent include hydrogen peroxide, ozone, sodium peroxide, sodium perborate, sodium percarbonate, peracetic acid, dehalogenating enzyme, calcium sulfite, ascorbic acid, and the like. The hydrogen peroxide and ozone are respectively used as a hydrogen peroxide solution and an ozone solution.

The concentration of the dehalogenation agent in the reaction solution used in Step (A) depends on the kind of the dehalogenation agent, and is preferably about 0.1 to 100 g/L, and more preferably about 0.67 to 10 g/L.

The addition amount of the dehalogenation agent is preferably about 1 to 300% owf, and more preferably about 2 to 30% owf.

The reducing agent is selected from those capable of reducing the partially produced ketone to alcohol, but incapable of reducing the generated carboxyl group. Specific examples of the reducing agent include thiourea, hydrosulfite, sodium hydrogen sulfite, sodium borohydride, sodium cyanoborohydride, lithium borohydride, sodium acid sulfite (sodium bisulfite), thiourea dioxide, and the like. Of these, in view of ensuring excellent initial whiteness degree and preventing a decrease in whiteness degree, sodium borohydride and sodium hydrogen sulfite are preferable.

The solvent for the reaction solution containing a reducing agent may be ordinary water or other various different kinds of water including distilled water, ion-exchanged water, well water, and tap water. The concentration of the reducing agent contained in the reaction solution is preferably about 0.02 to 4 g/L, and more preferably about 0.2 to 2 g/L. With this limited concentration, embrittlement of the fabric caused by an excessive amount of reducing agent can be suppressed.

The addition amount of the reducing agent is preferably about 0.06 to 12% owf, and more preferably about 0.6 to 6.0% owf.

The pH of the reaction solution used in Step (A) is preferably about 7 or more, more preferably about 7.5 or more, and even more preferably about 8 or more to neutralize the oxidizing agent remaining in the oxidized cellulose fibers and maintain the activity of the reducing agent. The pH of the reaction solution used during the reduction with the reducing agent is preferably about 12 or less, more preferably about 11 or less, and even more preferably about 10 or less to inhibit the embrittlement of fabric by the alkaline side. The pH of the reaction solution can be adjusted by adding aqueous ammonia, hydrochloric acid, soda ash, NaOH, KOH, and the like, as appropriate.

The bath ratio of the reaction solution used in Step (A) and the cellulose fibers is preferably about 5 to 100 g, and more preferably about 5 to 50 g per gram of the cellulose fibers. By setting the amount of the reaction solution to about 5 g or more per gram of the cellulose fibers, the liquid contact of the reaction solution with the cellulose fibers becomes excellent, and an effect of neutralizing the oxidizing agent remaining in the cellulose fibers can be obtained. By setting the amount of the reaction solution to about 100 g or less per gram of the cellulose fibers, the stirring efficiency between the cellulose fibers and the reaction solution can be maintained.

The temperature in Step (A) is preferably about 10° C. or more, and more preferably about 20° C. or more because an effect of dechlorination can be exhibited, and the reduction reaction proceeds well. The temperature in Step (A) is preferably about 90° C. or less, and more preferably about 80° C. or less because the deterioration of the cellulose fibers due to alkalic properties can be suppressed.

The duration of Step (A) is preferably about 5 min or more, and more preferably about 10 min or more. The duration of Step (A) is also preferably about 60 min or less, and more preferably about 40 min or less because embrittlement and hardening of fabric occur when subjected to alkali conditions for a long period of time.

In the hydrophilic cellulose fibers (oxidized cellulose fibers) obtained by the above-described hydrophilic treatment method of the present invention as explained above, at least a portion of the hydroxyl group residing in the cellulose microfibril surface is oxidized only by a carboxyl group. The hydrophilic cellulose fibers are also defined as cellulose fibers containing an aldehyde group in an amount of less than 0.05 mmol/g.

More specifically, the above hydrophilic cellulose fibers are hydrophilic cellulose fibers containing no aldehyde at all at the C6 position of the cellulose microfibril surface, or may be regarded as such hydrophilic cellulose fibers. The hydrophilic cellulose fibers regarded as hydrophilic cellulose fibers containing no aldehyde at all are equivalent to hydrophilic cellulose fibers containing less than 0.05 mmol/g of the aldehyde group. This range of aldehyde content ensures prevention of decrease in fiber strength (bursting strength) due to the aldehyde group, and prevention of coloring by heat. The content of the aldehyde group content is more preferably 0.01 mmol/g or less, and even more preferably 0.001 mmol/g or less.

According to the currently known measurement methods, the detection limit of aldehyde group is about 0.001 mmol/g. Therefore, in a preferred embodiment, hydrophilic cellulose fibers in which no aldehyde group is detected in the measurement can be obtained.

The aldehyde content can be measured, for example, according to the following steps.

First, a hydrophilic cellulose fiber sample is weighed (dry weight) and placed in water. After a 0.1 M hydrochloric aqueous solution is added to adjust the pH to about 2.5, a 0.05 M sodium hydroxide aqueous solution is added dropwise, and electrical conductance is measured. The measurement is continued until the pH reaches 11. The amount of functional group is determined according to the following equation based on the consumption of sodium hydroxide (amount of sodium hydroxide solution) (V) in the neutral condition of a weak acid in which the fluctuation in electrical conductance is relatively moderate. This amount of a functional group corresponds to the amount of a carboxyl group.

Amount of functional group (mmol/g)=$V$ (ml)×0.05/ mass (g) of cellulose

Thereafter, the hydrophilic cellulose fiber sample subjected to measurement of carboxylate content is further oxidized in a 2% sodium chlorite aqueous solution, which was adjusted in pH to 4 to 5 by adding an acetic acid, for 48 hours at room temperature. Then, the sample is again subjected to measurement of functional group content by the aforementioned method. The aldehyde content can be found by subtracting the carboxylate content from the measured amount of the functional group.

In the present invention, dehalogenation is performed in which a dehalogenation agent, a reducing agent, and oxidized cellulose fibers are mixed to remove halogens remaining in the oxidized cellulose fibers, together with reduction in which a ketone group present in position 2 and/or position 3 of each glucose unit in the oxidized cellulose fibers is reduced.

Examples of the oxidized cellulose fibers obtained by the reduction method include, in addition to oxidized cellulose fibers in which the primary hydroxy group of the glucose unit obtained by the first oxidation in Step (1) and the second oxidation in Step (2) are selectively oxidized to a carboxyl group, and partially have a ketone group at position 2 and/or position 3 of the glucose unit, oxidized cellulose fibers having a ketone group at C2 position and/or C3 position of a partially glucose unit obtained by bleaching the cellulose fibers by ozone, sodium hypochlorite, calcium hypochlorite, sodium chlorite, chlorine dioxide gas, etc.

A dehalogenation method and a method for reducing a ketone group at position 2 and/or position 3 of each glucose unit in the oxidized cellulose fibers are the same as those in Step (A) described above.

Because the hydrophilic cellulose fibers obtained by the method for producing hydrophilic cellulose fibers of the present invention do not substantially contain an aldehyde group at the C6 position, a coloring component derived from an aldehyde group is not produced when the fibers are heated. Therefore, the hydrophilic cellulose fibers obtained by the above production method are suitable for materials of underwear or similar clothing articles that require high whiteness degree. The hydrophilic cellulose fibers are also easy to handle, as they ensure stable quality even under heat and are resistant to various processes.

Moreover, the hydrophilic cellulose fibers obtained by the above production method are protected from breakage of cellulose microfibril caused by the aldehyde group, which often occurs during the production process. Therefore, the hydrophilic cellulose fibers ensure an improved hygroscopic property while hardly deteriorating the strength of the starting material of the cellulose fibers.

As described above, the hydrophilic cellulose fiber in which the primary hydroxyl group of the cellulose microfibril is oxidized to a carboxyl group has a superior hygroscopic property, thereby ensuring a further superior heat liberation effect or exothermic effect. The hydrophilic cellulose fiber is suitable for various fiber products.

Examples of the fiber products include clothing articles, general merchandise, interior accessories, bedding, and industrial materials.

Examples of the clothing articles include outdoor garments, sportswear, home wear, relaxation wear, pajamas, nightwear, underwear, office wear, work wear, food manufacturing white coats, medical white coats, patient gowns, nursing care clothes, school uniforms, and chef uniforms. Examples of the underwear include shirts, briefs, shorts, girdles, pantyhose, tights, socks, leggings, belly bands, long drawers, long underpants, and petticoats.

Examples of the general merchandise include aprons, towels, gloves, scarves, hats, shoes, sandals, bags, and umbrellas, Examples of the interior accessories include curtains, carpets, mats, kotatsu [small table with an electric heater underneath] covers, sofa covers, cushion covers, side fabric for sofas, toilet seat covers, toilet mats, and tablecloths.

Examples of the bedding include side fabrics for bedding, filling cotton for bedding, blankets, side fabrics for blankets, fillers for pillows, sheets, waterproofing sheets, comforter covers, and pillow cases.

Examples of the industrial materials include filters.

EXAMPLES

The present invention is more specifically explained below with reference to Examples. However, the present invention is not limited to these Examples.

Examples 1-1 to 1-3

First Oxidation (Step (1))

Using the reaction solution and reaction conditions shown in Table 1, the first oxidation with 2,2,6,6-tetramethylpiperidine N-oxyl (TEMPO) and sodium hypochlorite (NaClO) was performed on a fabric (cellulose fiber) according to the following procedure. A 100% cotton knitted fabric (40 yarn count unbleached fraise fabric) was used as fabric.

TEMPO and sodium bromide (NaBr) shown in Table 1 were dissolved in water, and the fabric was sufficiently immersed in the obtained solution. NaClO was added to the solution in which the fabric had been immersed, so as to adjust the pH to that of Table 1. The first oxidation was performed under the conditions shown in Table 1. A 5 wt % NaClO aqueous solution was used, and the amount and the addition amount shown in Table 1 are the amount and the addition amount of the 5 wt % NaClO aqueous solution.

TABLE 1

| First reaction solution | Condition |
| --- | --- |
| TEMPO | 2.5% owf (0.8 g/L) |
| NaBr | 17.5% owf (5.8 g/L) |
| NaClO | 180% owf (60 g/L) |
| (5 wt % Aqueous solution) | |
| Reaction temperature | 25° C. |
| Reaction time | 10 minutes |
| pH | 10 |
| Bath ratio | 1:30 (Weight ratio) |
| (Fabric:Reaction solution) | |

After the first oxidation using TEMPO and NaClO, each sample was removed from the reaction solution and washed with water.

Second Oxidation (Step (2))

Each sample fabric subjected to the first oxidation in Step (1) and washing with cold water was subjected to the second oxidation with sodium chlorite ($NaClO_2$) using the reaction solution and reaction conditions shown in Table 2. CG1000 in Table 2 was the chlorite bleaching chelating agent Neocrystal (Nicca Chemical Co., Ltd.). A 25 wt % $NaClO_2$ aqueous solution was used, and the amount and the addition amount shown in Table 2 are the amount and the addition amount of the 25 wt % $NaClO_2$ aqueous solution.

TABLE 2

| Second reaction solution | Condition |
|---|---|
| $NaClO_2$ (25 wt % aqueous solution) | 20% owf (10 g/L) |
| CG 1000 | 2% owf (1 g/L) |
| Reaction temperature | 80° C. |
| Reaction time | 90 minutes |
| pH | 3.8 |
| Bath ratio (Fabric:Reaction solution) | 1:20 (Weight ratio) |

After the second oxidation using the reaction solution and the reaction condition shown in Table 2, each sample was removed, washed with hot water having a temperature of 60° C., and then washed with cold water.

Dechlorination and Reduction (Step (A))

Reaction solution containing hydrogen peroxide ($H_2O_2$) and sodium borohydride ($NaBH_4$) shown in Tables 3 and 6 were prepared. Each sample fabric subjected to the second oxidation, washing with hot water, and washing with cold water was introduced in each reaction solution, and dechlorination with $H_2O_2$ and reduction with $NaBH_4$ were performed at the same time under the reaction conditions shown in Tables 3 and 6. PLC7000 in Table 3 was the polycarboxylic acid chelating agent Neorate (Nicca Chemical Co., Ltd.). A 35 wt % $H_2O_2$ aqueous solution was used, and the amount and the addition amount shown in Table 3 are the amount and the addition amount of the 35 wt % $H_2O_2$ aqueous solution.

TABLE 3

| Reaction solution | Condition |
|---|---|
| $H_2O_2$ (35 wt % aqueous solution) | 5% owf (1.7 g/L) |
| PLC7000 | 1.2% owf (0.4 g/L) |
| $NaBH_4$ | Shown in Table 6 |
| Reaction temperature | 50° C. |
| Reaction time | 20 minutes |
| pH | 10.6 |
| Bath ratio (Fabric:Reaction solution) | 1:30 (Weight ratio) |

After the dechlorination and reduction, each sample was removed, washed with hot water having a temperature of 60° C., and then washed with cold water.

Neutralization

Each sample fabric after the dechlorination and reduction (Step (A)) was subjected to neutralization using 1.0 mol/L hydrochloric acid to adjust the pH to 4.

Washing and Drying

The sample fabric thus subjected to the neutralization was washed sequentially with cold water (5 minutes, once), hot water (60° C., 10 minutes, once), and cold water (5 minutes, twice). Thereafter, the sample fabric was dried in a drying chamber kept at 40° C.

Comparative Example 1-1

Hydrophilic cellulose fibers were produced in the same manner as in Example 1, except that the dechlorination under the conditions shown in Table 4, and reduction shown in Table 5 after washing were separately performed in a different bath in place of the dechlorination and reduction in Step (A.). In the dechlorination, a 35 wt % $H_2O_2$ aqueous solution was used. The amount and the addition amount shown in Table 4 are the amount and the addition amount of the 35 wt % $H_2O_2$ aqueous solution.

Comparative Example 1-2

Hydrophilic cellulose fibers were produced in the same manner as in Example 1, except that the dechlorination under the conditions shown in Table 4 and reduction shown in Table 5 (the reduction was performed at 50° C. in this case) after washing were separately performed in a different bath in place of the dechlorination and reduction in Step (A.).

Comparative Example 1-3

Hydrophilic cellulose fibers were produced in the same manner as in Example 1, except that the dechlorination under the conditions shown in Table 4 was performed without performing reduction, in place of the dechlorination and reduction in Step (A).

Comparative Example 1-4

Hydrophilic cellulose fibers were produced in the same manner as in Example 1, except that the reduction under the conditions shown in Table 5 was performed without performing dechlorination, in place of the dechlorination and reduction in Step (A.).

TABLE 4

| Reaction solution | Condition |
|---|---|
| $H_2O_2$ (35 wt % aqueous solution) | 5% owf (1.7 g/L) |
| PLC7000 | 1.2% owf (0.4 g/L) |
| pH | 10.6 |
| Reaction temperature | 70° C. |
| Reaction time | 20 minutes |
| Bath ratio (Fabric:Reaction solution) | 1:30 (Weight ratio) |

TABLE 5

| Reaction solution | Condition |
|---|---|
| $NaBH_4$ | 5% owf (2 g/L) |
| pH | 10 |
| Reaction temperature | 25° C. |
| Reaction time | 20 minutes |
| Bath ratio (Fabric:Reaction solution) | 1:50 (Weight ratio) |

Evaluation Result

Table 6 shows the carboxylate content (COOH group content), degree of polymerization, and decrease in whiteness degree of each sample fabric (Examples 1-1 to 1-3 and Comparative Examples 1-1 to 1-4) produced by the above production step.

The carboxylate content was measured by using conductometric titration, and the degree of polymerization was measured according to the following method.

The fibers collected from each sample fabric were reduced in advance with sodium borohydride to reduce remaining aldehyde to alcohol, and the fibers were dissolved in a 0.5 M copper-ethylenediamine solution. The degree of polymerization was thus obtained according to a viscosity method.

Because the copper-ethylenediamine solution is an alkaline solution, β-elimination reaction may occur during the dissolution process to decrease the molecular weight if the aldehyde group remains in the oxidized cellulose. Therefore, reduction was performed in advance, thereby converting the aldehyde group into an alcoholic hydroxy group.

The formula to calculate the degree of polymerization of the cellulose based on the viscosity of the cellulose dissolved in a 0.5 M copper-ethylenediamine solution was found by reference to the document Isogai A., Mutoh N., Onabe F., Usuda M., "Viscosity measurements of cellulose/$SO_2$-amine-dimethylsulfoxide-solution," Sen'i Gakkaishi, 45, 299-306, (1989).

For whiteness degree, the difference in whiteness degree between before and after drying of each sample calculated as L*-3b* according to the CIELAB color system (measured in a micro area) using a Macbeth White-Eye 3000 (product of Kollmorgen Instruments Corporation) was measured and regarded as a decrease in whiteness degree. The whiteness degree after absolute drying is the whiteness degree after the measurement of absolute dry weight according to JIS L-0105 4.3.

The "cotton fabric after bleaching" shown in Table 6 was obtained as follows. After refinement of a 40 yarn count unbleached fraise fabric, bleaching was performed by $NaClO_2$ treatment and $H_2O_2$ treatment, followed by dehydration and drying.

Table 6 shows the treatment temperature of dechlorination and reduction in Step (A), the concentration of $NaBH_4$, and the evaluation results of the obtained sample fabrics.

TABLE 6

| | NaBH₄ treatment condition | | | | | |
|---|---|---|---|---|---|---|
| | Treatment temperature (° C.) | $H_2O_2$ condition | $NaBH_4$ (% owf) | Carboxylate content (mmol/g) | Degree of polymerization | Decrease in whiteness degree |
| Example 1-1 | 50 | Same bath | 3.0 | 0.347 | 1569 | −0.8 |
| Example 1-2 | | | 4.0 | 0.343 | 1538 | −0.6 |
| Example 1-3 | | | 5.0 | 0.344 | 1461 | −0.6 |
| Comparative Example 1-1 | 25 | Different bath | 5.0 | 0.342 | 1204 | −1.2 |
| Comparative Example 1-2 | 50 | Different bath | 5.0 | 0.344 | 1149 | −1.8 |
| Comparative Example 1-3 | — | — | — | 0.311 | 1226 | −4.4 |
| Comparative Example 1-4 | 25 | — | 5.0 | 0.347 | 1109 | −2.2 |
| Cotton fabric after breaching | — | — | — | 0.053 | — | −0.4 |

Results and Investigation

Table 6 indicates that in Examples 1-1 to 1-3 in which dechlorination with $H_2O_2$ and reduction with $NaBH_4$ were performed at the same time in the same bath, the carboxylate content was not decreased, and decrease in the degree of polymerization and the whiteness degree of oxidized cellulose fibers can be inhibited.

In contrast, in Comparative Example 1-1 in which dechlorination with $H_2O_2$ and reduction with $NaBH_4$ were performed in a different bath, decrease in degree of polymerization and whiteness degree was confirmed compared to Examples 1-1 to 1-3, even though the reduction treatment temperature was low such as 25° C. due to $NaBH_4$.

The same results as in Comparative Example 1-1 were obtained in Comparative Example 1-2 in which dechlorination with $H_2O_2$ and reduction with $NaBH_4$ were performed in a different bath at 50° C. In Comparative Example 1-3 in which dechlorination with $H_2O_2$ was performed without conducting reduction with $NaBH_4$, the whiteness degree was significantly decreased. In Comparative Example 1-4 in which reduction with $NaBH_4$ was performed at 25° C. without conducting dechlorination with $H_2O_2$, decrease in degree of polymerization and whiteness degree was confirmed compared to Examples 1-1 to 1-3.

Example 2

Hydrophilic cellulose fibers were produced in the same manner as in Example 1, except that the first oxidation of fabric (cellulose fiber) with TEMPO and sodium dichloroisocyanurate (SDIC) was performed using the reaction solution and reaction conditions shown in Table 7 in the first oxidation in Step (1).

TABLE 7

| First reaction solution | Condition |
|---|---|
| TEMPO | 2.5% owf (0.8 g/L) |
| NaBr | 17.5% owf (5.8 g/L) |
| SDIC | 10% owf (3.3 g/L) |
| Reaction temperature | 25° C. |
| Reaction time | 10 minutes |
| pH | 10 |
| Bath ratio (Fabric:Reaction solution) | 1:30 (Weight ratio) |

Comparative Example 2

Hydrophilic cellulose fibers were produced in the same manner as in Example 2, except that the dechlorination and reduction were separately performed in a different bath under the same conditions of Comparative Example 1-1, in place of the dechlorination and reduction in Step (A).

Evaluation Results

The carboxylate content, degree of polymerization, and decrease in whiteness degree of the hydrophilic cellulose fibers obtained in Example 2 and Comparative Example 2 were calculated according to the same method as in Example 1. Table 8 shows the evaluation results.

TABLE 8

| | NaBH$_4$ + H$_2$O$_2$ treatment | carboxylate content (mmol/g) | Polymerization degree | Decrease in whiteness degree |
|---|---|---|---|---|
| Example 2 | Same bath | 0.328 | 1498 | −0.8 |
| Comparative Example 2 | Different bath | 0.309 | 1427 | −1.2 |
| Cotton fabric after bleaching | — | — | — | −0.8 |

Results and Investigation

Table 8 indicates that in Example 2 in which SDIC was used as an oxidizing agent in the first oxidation, the carboxylate content was not decreased, and decrease in the degree of polymerization and whiteness degree of the oxidized cellulose fibers can be inhibited when dechlorination with H$_2$O$_2$ and reduction with NaBH$_4$ were performed at the same time in the same bath as in Example 1.

In contrast, in Comparative Example 2 in which dechlorination with H$_2$O$_2$ and reduction with NaBH$_4$ were separately performed in a different bath in the first oxidation using SDIC as an oxidizing agent, decrease in degree of polymerization and whiteness degree was confirmed compared to Example 2.

The invention claimed is:

1. A method for producing hydrophilic cellulose fibers, comprising:
    performing dehalogenation together with reduction,
    the dehalogenation comprising mixing a dehalogenation agent, a reducing agent, and oxidized cellulose fibers to remove halogens remaining in the oxidized cellulose fibers, and
    the reduction comprising reducing a ketone group at position 2 and/or position 3 of each glucose unit in the oxidized cellulose fibers,
    wherein reduction is performed together with the dehalogenation by adding the oxidized cellulose fibers to a reaction solution containing the dehalogenation agent and the reducing agent.

2. The method for producing hydrophilic cellulose fibers according to claim 1, wherein the dehalogenation agent is at least one member selected from the group consisting of hydrogen peroxide, ozone, sodium peroxide, sodium perborate, sodium percarbonate, and peracetic acid.

3. The method for producing hydrophilic cellulose fibers according to claim 1, wherein the reducing agent is at least one member selected from the group consisting of thiourea, hydrosulfite, sodium hydrogen sulfite, sodium borohydride, sodium cyanoborohydride, lithium borohydride, sodium acid sulfite, and thiourea dioxide.

4. The method for producing hydrophilic cellulose fibers according to claim 1, wherein the reaction solution has a pH of 7 to 12.

5. The method for producing hydrophilic cellulose fibers according to claim 1, wherein the reaction solution has a temperature of 10 to 90° C.

6. The method for producing hydrophilic cellulose fibers according to claim 1, wherein the oxidized cellulose fibers are obtained by at least a step of (1) a first oxidation step of oxidizing cellulose fibers in a first reaction solution containing an N-oxyl compound and an oxidizing agent for the N-oxyl compound.

7. The method for producing hydrophilic cellulose fibers according to claim 6, wherein the oxidizing agent in Step (1) is a hypohalous acid, a halogenated isocyanuric acid, or a salt thereof.

8. The method for producing hydrophilic cellulose fibers according to claim 6, wherein the oxidized cellulose fibers are obtained by a further step of (2) a second oxidation step in which an aldehyde group present in the oxidized cellulose fibers obtained in Step (1) is oxidized by oxidizing in a second reaction solution containing an oxidizing agent.

9. The method for producing hydrophilic cellulose fibers according to claim 8, wherein the oxidizing agent in Step (2) is a halogen oxidizing agent.

10. The method for producing hydrophilic cellulose fibers according to claim 6, wherein the first reaction solution further comprises a promoter in Step (1).

* * * * *